United States Patent [19]

Mattern

[11] 4,189,624
[45] Feb. 19, 1980

[54] DIGITAL TIME DIVISION MULTIPLEX TELECOMMUNICATION NETWORK

[75] Inventor: Alfred Mattern, Gröbenzell, Fed. Rep. of Germany

[73] Assignee: Siemens Aktiengesellschaft, Munich, Fed. Rep. of Germany

[21] Appl. No.: 784,431

[22] Filed: Apr. 4, 1977

[30] Foreign Application Priority Data

Apr. 30, 1976 [DE] Fed. Rep. of Germany ....... 2619295

[51] Int. Cl.² ............................................. H04J 3/08
[52] U.S. Cl. ........................... 179/15 AL; 179/15 BF; 179/15 BD; 179/18 EA
[58] Field of Search ........ 179/15 AL, 15 BF, 18 EA, 179/15 BD

[56] References Cited

U.S. PATENT DOCUMENTS

| Re. 28,811 | 5/1976 | Pierce | 179/15 AL |
| 3,925,621 | 12/1975 | Collins | 179/15 AL |
| 4,002,843 | 1/1977 | Rackman | 179/15 AL |
| 4,002,847 | 1/1977 | Dail | 179/15 AL |
| 4,032,893 | 6/1977 | Moran | 179/15 AL |
| 4,042,780 | 8/1977 | Wolters | 179/15 AL |
| 4,048,446 | 9/1977 | Hafner | 179/15 AL |

Primary Examiner—David L. Stewart
Attorney, Agent, or Firm—Schuyler, Birch, McKie & Beckett

[57] ABSTRACT

A digital time division multiplex (TDM) telecommunication network is described wherein subscriber terminals are connected to a closed TDM loop which forms branch loops appropriately routed to remote subscriber groups or network sections. The branch loops may be bypassed by a connecting device in the event of a fault.

2 Claims, 2 Drawing Figures

U.S. Patent　　　Feb. 19, 1980　　　4,189,624
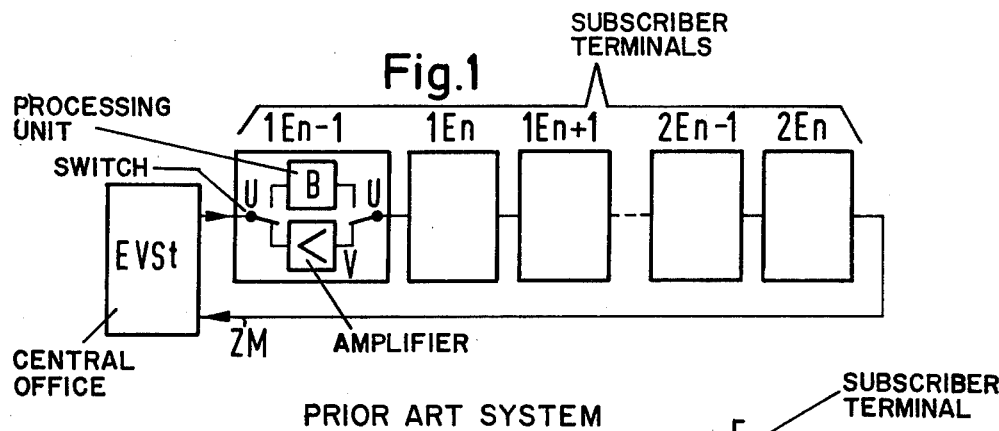
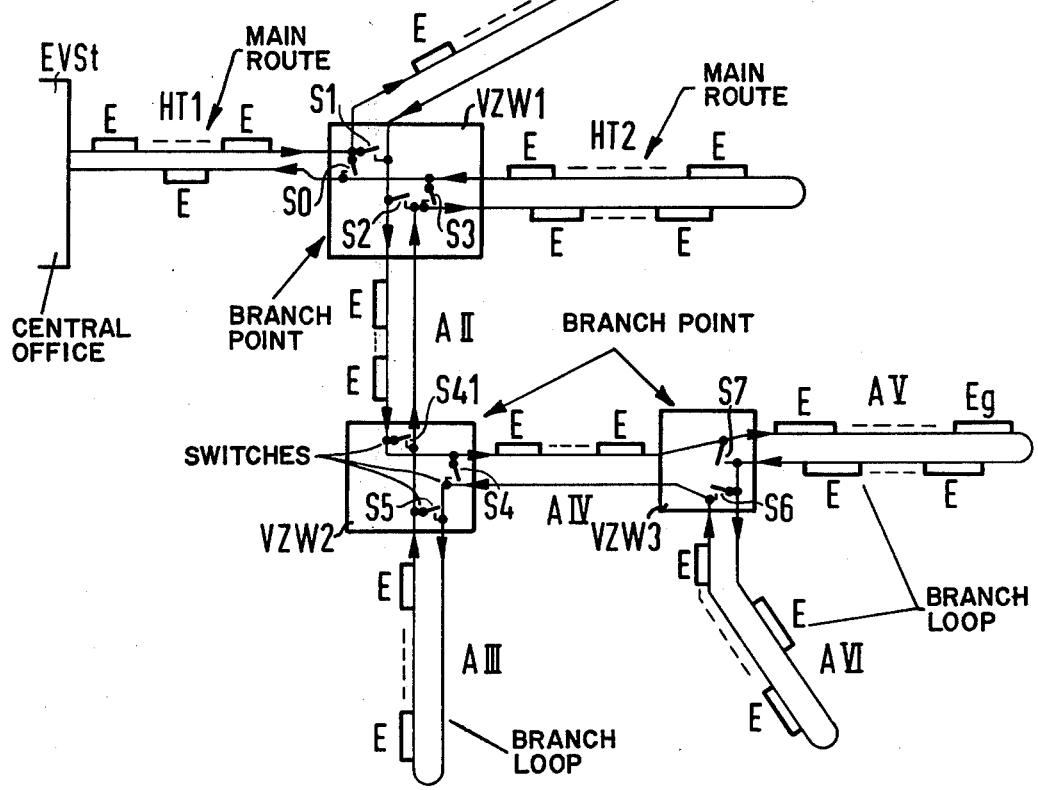

DIGITAL TIME DIVISION MULTIPLEX TELECOMMUNICATION NETWORK

BACKGROUND OF THE INVENTION

The invention relates to a digital time division multiplex (TDM) telecommunication network wherein the subscriber terminals are selectively connected in a defined sequence to a common TDM network path or highway and then through a central office. The TDM highway begins at the central office, and it ultimately ends there. The telecommunication data in each pulse frame for subscriber terminals involved in calls are transmitted in the sequence of their connection to the TDM highway and are received by the first subscriber terminal that has not yet been supplied with information whereupon the latter immediately thereafter transmits in an outgoing direction to the central office the information to be sent by it past subsequent subscriber terminals.

Unbranched systems of the above type are known, for example, in West German patent application No. P 24 38 199.5-31 the TDM highway is a single unbranched path. A copy of the West German patent application No. P 24 38 199.5-31 can be found in the application file. A translation of this West German patent application also can be found in the application file. This translation corresponds to U.S. Pat. No. 4,051,328 in which foreign priority was claimed based on West German patent application No. P 24 38 199.5-31. This U.S. Pat. No. 4,051,328 was issued on Sept. 27, 1977 to the same inventor and assigned to the same assignee as the present invention.

Even in the region of a local central office there may be a need for a branched system, namely, if there are remote groups of terminals.

If, as assumed hereinabove, the TDM highway begins from the central office and terminates therein, i.e., if only one looped circuit is provided, the interruption of such a loop at any point means the breakdown of the entire network of terminals.

Therefore, it is an object of the invention to provide for a telecommunication network of the type mentioned hereinabove having a branching structure for accommodating remote groups of subscriber terminals whereby, in addition, complete breakdowns are avoided.

SUMMARY OF THE INVENTION

In accordance with the invention, the foregoing and other objects are achieved in that the TDM highway forms for the supply of remote groups of subscriber terminals branch loops from a main route. The line sections of the loops returning to the branching point are continued therein by an outgoing or continuing line section of a further branch loop or of the main route. The outgoing or continuing line section at the branching points and the returning line section to that point, respectively, of the main route may be connected together or short-circuited by a device that is activated from the local office.

Hence, the solution offered by the invention results in a branching system which, to a large extent, is secure against a complete breakdown or a breakdown of large network sections and wherein, without requiring more expense, the advantages possessed by an existing unbranched system consisting of only one looped circuit can be achieved. The advantages of the latter type of system are essentially the small number of switching devices in the subscriber terminals and for subscriber lines.

A further development of the invention provides for indicating the location of a fault upon activation of a given connecting device.

BRIEF DESCRIPTION OF THE DRAWINGS

The principles of the invention will be more readily understood by reference to the following descriptions of a prior art network and a preferred embodiment of the system according to the invention. These descriptions are accompanied by illustrative drawings which are briefly described as follows:

FIG. 1 is a block-schematic diagram of a TDM network of known construction upon which the invention is based, and FIG. 2 is a schematic diagram of a preferred embodiment of a branched TDM telecommunication network secured against complete breakdown in accordance with the invention.

DETAILED DESCRIPTION OF THE PRIOR ART SYSTEM

In the TDM telecommunication network shown in FIG. 1 there is provided a TDM highway ZM which is closed to form a ring, which begins from a central office and terminates therein. The telecommunication network which is generally described below with reference to FIG. 1 is the same telecommunication network described in detail in West German Patent Application No. P 24 38 199.5-31, a copy and translation of which can be found in the application file. The translation corresponds to U.S. Pat. No. 4,051,328. Subscriber terminals are connected to the TDM highway ZM, and are marked by indices in the sequence of their connection. Thus, one subscriber terminal is labled 1En which, viewed in an outgoing direction from the central office receives information located in time behind information being communicated to subscriber terminal 1En—1, but in front of information being communicated to subscriber terminal 1EN+1. The prefixed number 1 in the reference symbol indicates that these are Class 1 subscriber terminals, e.g., telephone subscriber terminals, whereas the subscriber terminals 2En—1 and 2En are data terminals and have suffixes indicating the same sequence as described above.

In this case, the subscriber terminals in question are connected to TDM highway ZM in such a way that they either merely relay the bit groups transferred to their inputs or pass on to their processing unit B information transferred to their input, in which case they are ready for the acceptance thereof. When the bit groups are merely relayed, they are sometimes reinforced but otherwise left unaltered, in which case the subscriber terminals merely work as repeaters. Accordingly, in this situation the subscriber terminals are blocked for receiving bit groups transmitted by the central office as well as bit groups transmitted by preceding subscriber terminals. As will be detailed hereinbelow, the mode of operation wherein information is accepted by a subscriber terminal can only result in connection with information that has been transmitted from the local office. The above conditions are illustrated with the aid of selector switches that are capable of switching between amplifier component V and processing unit B.

If, as an example, it is assumed that during a given time the three terminals 1En−1, 1En and 1En+1 are subscriber terminals involved in a call, then, at the start of each sampling pulse frame they are made ready by an appropriate unblocking bit group passing through all activated subscriber terminals with equal effect for facilitating acceptance of information transmitted from the central office. The information provided for these subscriber terminals is transmitted from the central office in the sequence in which the terminals are connected to the TDM highway. Thus, within each sampling pulse frame first the information for subscriber terminal 1En−1, then the information for subscriber terminal 1En and, finally, the information for subscriber terminal 1En+1 are transmitted.

On the section of TDM highway ZM outgoing from the central office, the information for subscriber terminal 1En−1 sent initially reaches this subscriber terminal as the first activated terminal which accepts the telecommunication information. In turn, this terminal transmits an item of information still in the same time position, i.e., before a subsequent bit group proceeds past it. The transmitted item of telecommunication information proceeds on TDM highway ZM toward the second subscriber terminal 1En. The transmitted item of telecommunication information from terminal 1En−1 is merely reinforced by this subsequent subscriber terminal 1En and by all further subscriber terminals. Thus, this information cannot be accepted by them as an item of telecommunication information coming from the local office. This non-acceptance by the other subscriber terminals is under the control of a corresponding criterion accompanying the telecommunication information outgoing from subscriber terminals.

The telecommunication information transmitted from subscriber terminal 1En−1 is finally transferred back to central office EVSt over the returning section of TDM highway ZM.

Upon acceptance of the telecommunication information coming from the local office and intended for subscriber terminal 1En−1, the latter is blocked for the remainder of the sampling pulse frame from accepting further items of telecommunication information transmitted from the local office.

The next item of telecommunication information transmitted from central office EVSt thus reaches the second subscriber terminal 1En−1 in unaltered condition, and it is there accepted. This subscriber terminal, as described for the preceding one, also transmits its item of telecommunication information which passes through all subsequent subscriber terminals and, finally, also returns to the local office. In like fashion, the remaining subscriber terminals also accept telecommunication information from the local office during the relevant time slots which correspond to the sequence of their connection to TDM highway ZM and relay telecommunication information thereto.

DETAILED DESCRIPTION OF THE PREFERRED EMBODIMENT

In the case of the branched TDM telecommunication network designed in accordance with the teachings of the invention and shown in FIG. 2, a main route for the TDM trunk is denoted by the symbols HT1 and HT2. The section HT1 is connected by an outgoing and an incoming line section to central office EVSt. As is evident from the discussion of a prior art system hereinabove, the components constituting the inventive system, e.g., central office EVSt, switches S and local offices E, are conventional and are, therefore, not described in detail herein.

Two branches AI and AII begin from this main route. The line section of main route portion HT1 beginning from the local office is not continued directly by a line section of main route portion HT2 in the region of a branch point, but runs in another direction in space. The returning line section of this branch AI is continued in the area of branching point VZW1 by the outgoing line section of the second of the second branch AII. Branch AII once more branches off in the region of another branching point VZW2 into branches AIII and AIV. Branch AIV, in turn, branches off in the region of branching point VZW3 into branches AV and AVI.

In the region of branching point VZW1 the returning line section of this branch AII continues in the outgoing line section of the second main route portion HT2. Finally, the returning line section of this main route portion HT1 is continued by the returning line section of main route portion HT1, which ends in central office EVSt.

Local offices E are connected both to main route portions and to branches AI-AVi in the manner depicted in FIG. 1. The local offices connected to the branches are associated with remote groups of local subscriber terminals or extensions of larger local networks.

In the region of branching points VZW1-VZW3 the line sections of the main route portions of the branches can each be bridged, i.e., short circuited by a switch S0-S7 that is activated from the local office.

Normally, that is to say, if all line sections and local offices are intact, all the switches S0-S7 remain open. This means that information outgoing from central office EVSt must pass through all successive line sections of the main route portions and branches until it reaches the subscriber terminal for which it is intended. The information transmitted from the latter subscriber terminal is relayed directly from there and passes through all continuing line sections of branches and main route portions thereby maintaining the sequence determined by the central office.

However, if for example, a fault should occur in branch AI in the form of an interruption of a line section thereof, switch S1 in branch point VZW is closed by the local office, and simultaneously, the routing of information intended for subscriber terminals E connected to branch AI is stopped. Again, this results in the closing of an intact looped circuit, and only the subscriber terminals connected to branch AI are affected by this fault.

Switches may likewise be disposed outside the region of branch point VZW, for example, switch Sz is located in branch AI. Thus, it is possible to restrict to a reasonable extent sections of the communication network taken out of operation when a fault occurs.

A description follows of how, in accordance with the described embodiment of the invention, a fault can be located through appropriate activation of the switches in branch points VZW.

Assuming that in branch AV the flow of information is prevented from passing because of a fault in a local office therein. Accordingly, the failure of the information flow to return is detected in central office EVSt. A diagnostic routine (to be described) is then initiated. The diagnostic routine is adapted to the pertinent network configuration, that is, to the wiring capacity of the individual network sections and of the probability of error therein. In the present case, this program may be devised as follows: First, switch S0 is closed and the transmission of all information intended for subscriber terminals connected to the bypassed network section (in this case, for subscriber terminals in branches AI-AVI and in the main route portion HT2) stopped.

Then the information flow resumes indicating that the main route portion HT1 is intact. Switch S0 is then reopened and switch S2 is closed, while simultaneously the information for the subscriber terminals that are connected to branches AI-AVI is suppressed. Again, an information flow resumes as an indication that branches AI and main route portion HT2, too, are intact. Switch S2 is again opened, followed by a closing of switch S4 with simultaneous suppression of the information for subscriber terminals in the network section (now bridged) comprising branches AIV, AV and AVI. Again, the flow of information resumes meaning that in branches AII and AIII, too, there is no fault.

After the opening of switch S4, switch S6 is closed, and the corresponding portion of the information flow suppressed. Despite the closing of this switch, there is no resumption of the information flow, since the faulty subscriber terminal is still incorporated in the remaining part of the overall network. In the present case, only the branch AV is possible as a fault location, so that switch S6 is reopened and switch S7 closed and remains closed even after the fault has been eliminated. Until then, the remaining traffic in the rest of the loop, i.e., the entire loop except the branch AV, continues.

Finally, a preferred form of a transmission medium for the system is glass fibre.

The principles of the invention are described herein by describing a preferred form of network configuration and it operating principles. The described system can obviously be modified or changed, as can the specifically described operating principles, while remaining within the scope of the invention as defined by the appended claims.

I claim:

1. In a digital time division multiplex (TDM) telecommunication network having central office means and a TDM highway having its ends connected to said central office means and having a plurality of subscriber terminals connected to said TDM highway in a predetermined order, said central office means transmitting information to said subscriber terminals in an order corresponding to the predetermined order of connection of said subscriber terminals to said TDM highway, each said subscriber terminal including means for passing information intended for other succeeding subscriber terminals, the improvement comprising:

said TDM highway being formed into at least two main route sections, each main route section having at least one branch loop extending from a branch point, each of said branch loops having outgoing and incoming line sections relative to said branch point, each of said incoming line sections being connected at said branch point to either an outgoing line section of another one of said branch loops or one of said main route sections;

a plurality of switch means located at said branch points for short circuiting individual ones of said branch loops and individual ones of said main route sections, wherein said central office means monitors the information flow on said TDM highway to determine the location of a fault condition in any one of said branch loops or one of said main route sections, selectively operates said plurality of switch means to short circuit the branch loop or the main route section in which the fault condition occurs and suppresses the information intended for the subscriber terminals on the branch loop or main route section which is short circuited by said plurality of switch means.

2. The improved digital TDM telecommunication network defined in claim 1 further comprising:

a plurality of additional switch means connected across said branch loops at locations other than said branch points, said plurality of additional switch means being selectively operated by said central office means in the event of a fault in any one of said branch loops;

said plurality of switch means and said plurality of additional switch means being operated to close and reopen or remain closed in a sequence such that only the segment of said branch loop or one of said main route sections in which a fault exist is located and bypassed.

* * * * *